Aug. 15, 1944.  W. A. PRYOR ET AL  2,355,675
BALING PRESS
Filed Oct. 12, 1942  6 Sheets-Sheet 1

Aug. 15, 1944.     W. A. PRYOR ET AL     2,355,675
BALING PRESS
Filed Oct. 12, 1942     6 Sheets-Sheet 2

Fig. 2.

Inventors:
William A. Pryor,
Thomas R. Harris,
By Cushman, Darby & Cushman
Attorneys

Aug. 15, 1944. W. A. PRYOR ET AL 2,355,675
BALING PRESS
Filed Oct. 12, 1942 6 Sheets-Sheet 4

Inventors:
William A. Pryor,
Thomas R. Harris,

Aug. 15, 1944. W. A. PRYOR ET AL 2,355,675
BALING PRESS
Filed Oct. 12, 1942 6 Sheets-Sheet 5

Inventors:
William H. Pryor,
Thomas R. Harris,

Patented Aug. 15, 1944

2,355,675

UNITED STATES PATENT OFFICE 2,355,675

BALING PRESS

William A. Pryor and Thomas R. Harris, Cordele, Ga., assignors to Harris Foundry & Machine Company, Cordele, Ga., a partnership Application October 12, 1942, Serial No. 461,720

17 Claims. (Cl. 78—42)

The present invention relates to baling presses, and is particularly adapted for baling scrap metal, although it may be utilized for baling other materials.

An object of the invention is the provision of baling presses capable of speedily and efficiently baling scrap material.

Another object is to provide means for quickly and efficiently ejecting the baled scrap from the press box or equivalent chamber. In this connection, means are employed to raise the bale from the floor of the press box to a point above the same, where it is then moved laterally of the press box to a point exteriorly of the baling press. One of the characteristics of this ejecting means is that the bale contacting elements normally constitute portions of the floor of the press box and wall of the baling press respectively and thus are not only out of the way during the actual baling, but assist in the baling operations.

A further object is the provision of compression means located transversely of the press box for effecting a final compression of the bale after it has been acted upon by the press box ram, and which positions the bale upon the lifting platform of the ejecting mechanism ready for immediate removal from the baling press.

An additional object is to provide means for expediting the baling operation by permitting scrap material to be deposited on the top wall of the gatherer platen or ram while it is still functioning as a wall of the tramper platen chamber during initial compression of the scrap material.

A further object is to provide means for locking the gatherer platen against any outward pressure or thrust when it reaches its innermost position, whereby leakage or failure of the hydraulic mechanism which operates the gatherer, will not affect the latter or permit it to creep out of its position as a wall of the tramper platen chamber.

Another object is to provide a compact construction wherein the hydraulic cylinders for the tramper and gatherer platens are mounted within the longitudinal confines of these members, and thus greatly reduces the space necessary to accommodate the baling press.

With the foregoing and other objects in view, the invention will now be more fully described, reference being had to the accompanying drawings, in which.

Referring now to the drawings, the numeral 10 designates generally the baling press of the present invention, consisting of a press box 11, a tramper platen 12 vertically movable within a housing or chamber 13, the lower end of which opens into the top of the press box 11. Positioned laterally of the chamber or housing 13 is a gatherer receptacle 14, in which is slidably mounted a gatherer platen 15. The inner end of the receptacle 14 is entirely open and communicates with the tramper chamber 13. A ram or piston 16 is longitudinally movable in the press box to compress the material which has been tramped or compressed into the press box by the tramper platen, and a final compression ram or piston 17 is located at one end, and transversely of, the press box for giving a final compression to the bale.

The operation of the device as thus far described is as follows:

Scrap material, such as scrap metal, is deposited in the receptacle 14 through an opening 18 in the top wall of the receptacle and this material is subsequently transferred to the chamber 13 by means of the gatherer platen 15, this gatherer having a solid vertical scrap engaging wall 19 which moves the material into the chamber 13. The wall 19 remains in its innermost position and constitutes a wall of the chamber 13 during downward movement of the tramper platen 12. This movement compresses the material into the press box 11 and the platen remains in its lower position while the piston or ram 16 moves into the press box to further compress the material. During this operation the wall or face 20 of the tramper platen remains in its lowermost position and forms the top wall of the press box. After the ram 16 moves to a point adjacent the inner end of the press box but in rear of the ram 17, the latter is operated to give a final compression to the baled scrap. This ram may be operated to travel either to the point shown in Figure 5, or further, depending upon the size of the bale desired. Thereafter an ejecting mechanism is placed in operation to raise the bale from the floor of the press box and slide it out of the chamber 13. This ejector mechanism will be described in detail hereinafter.

Figures 1, 9:
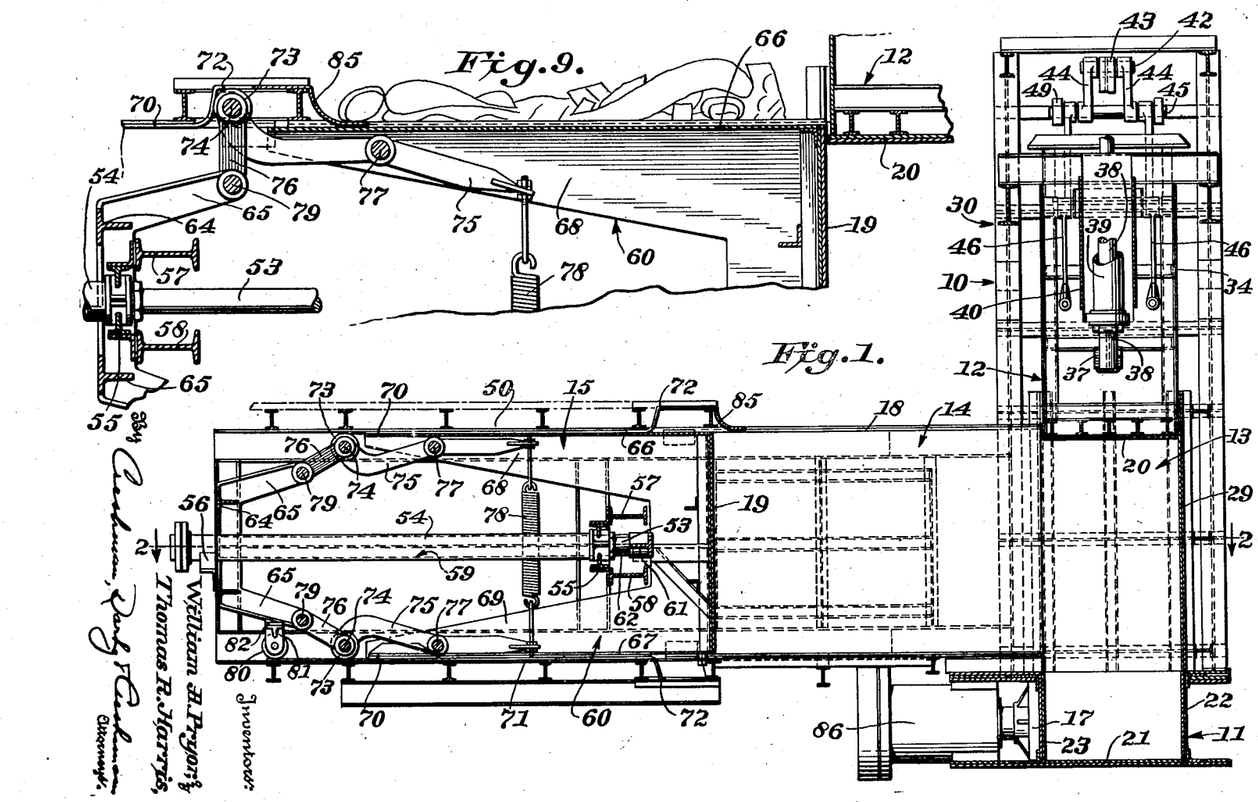
Figure 1 is a vertical sectional view of the baling press.
Figure 9 is a fragmentary sectional view of the upper part of the scrap depository and the gatherer platen in its innermost position.
Figure 2:
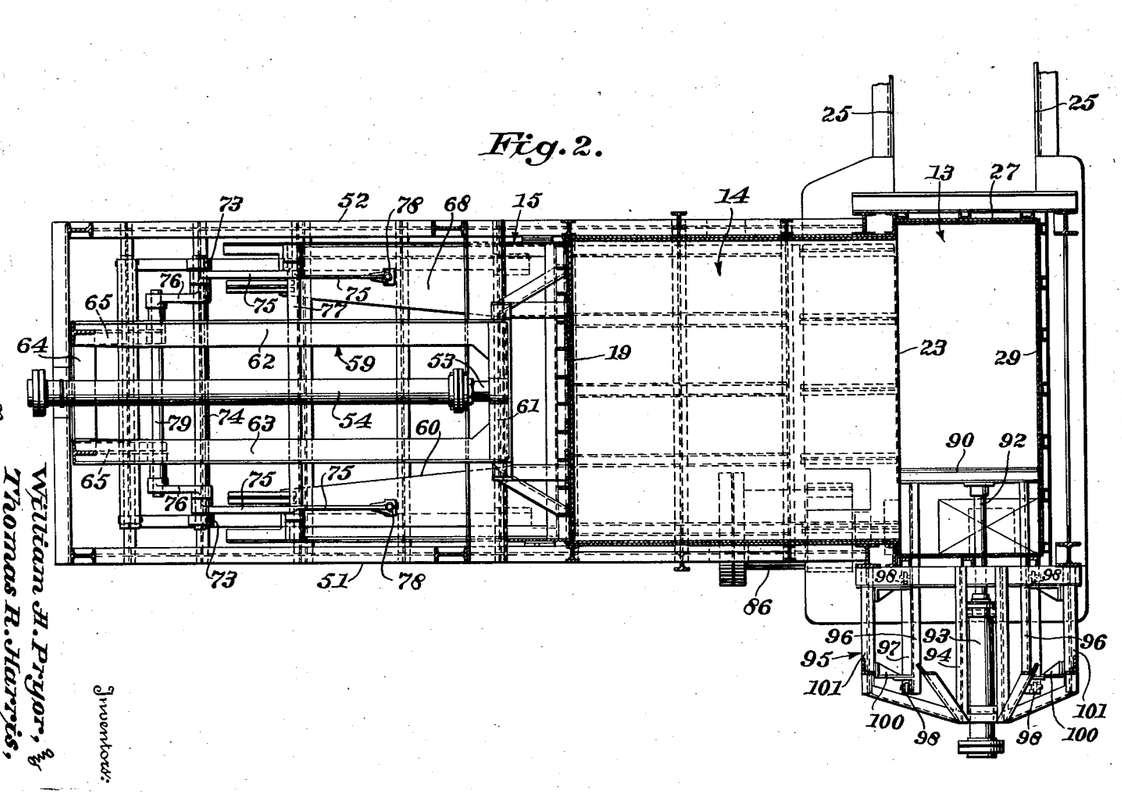
Figure 2 is a horizontal sectional view of the baling press taken on line 2—2 of Figure 1.
Figure 3:
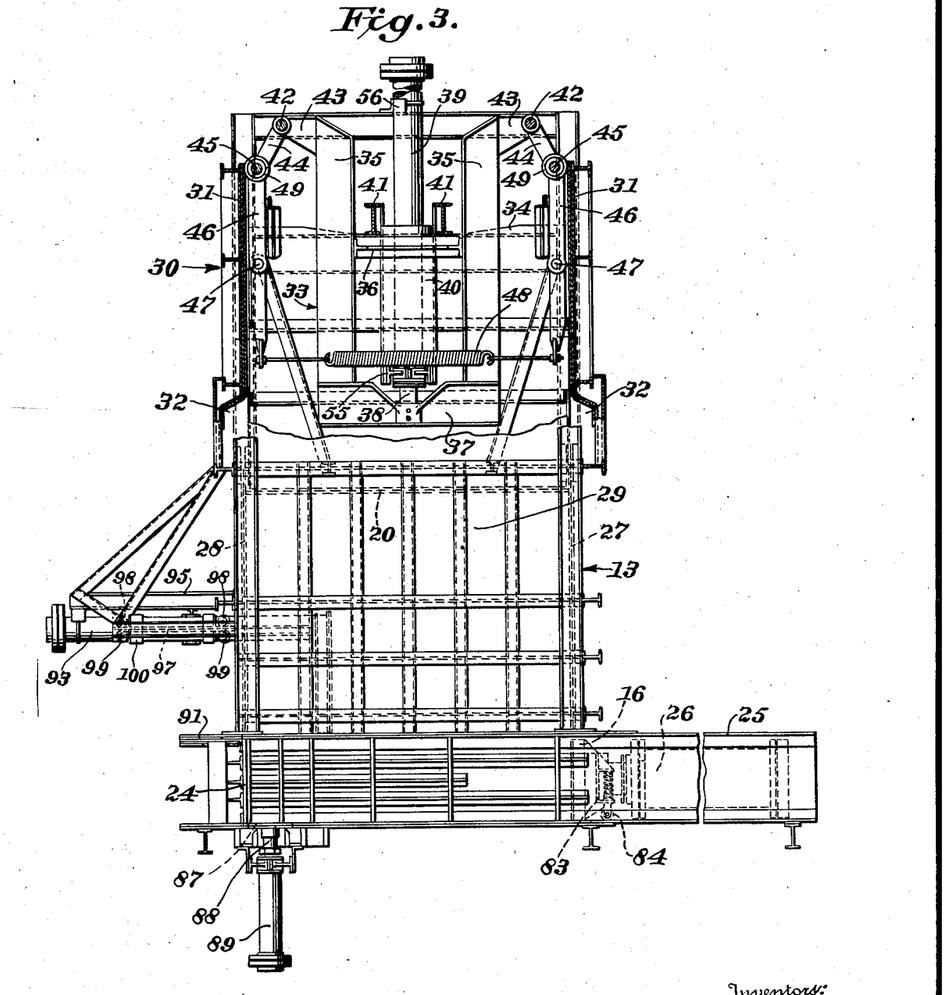
Figure 3 is an elevational view taken at right angles to Figure 1.

Referring now to Figures 1 to 3, the press box is preferably rectangular in formation, although it may be of any other desired configuration. It consists of a floor 21, side walls 22 and 23, respectively, and an end wall 24. The other end of the press box is extended beyond the chamber 13 to provide a housing 25 for a cylinder 26 which cooperates with the piston or ram 16 in effecting a compression of the material compressed into the press box by the tramper platen 12.

The chamber 13 is substantially box-like in configuration and comprises end walls 27 and 28, respectively, and a side wall 29. As hereinbefore described, the other side of the chamber 13 is left open for the reception of scrap material and the wall 19 of the gatherer platen constitutes the other side wall of the chamber 13 during the operation of the tramper platen 12.

The portion of the press above the chamber 13 comprises a tower or frame 30 for housing the tramper platen and its operating mechanism. This frame has formed thereon sets of tracks 31 which extend outwardly at their lower ends to form pockets 32, see Figure 3. The tramper platen comprises inner and outer sections 33 and 34, respectively, the outer section being of box-like formation and rigidly connected to the scrap engaging face or wall 20.

The inner section 33 comprises a substantially rectangular frame including beams or bars 35, an intermediate transverse member 36 and a lower cross bar 37. To the lower cross bar 37 is connected an operating piston 38 movable in a cylinder 39, the latter being secured to a casing 40, mounted between a pair of spaced cross beams 41. These cross beams have their ends fixed to the tower or frame 30. Thus, the cylinder 39 is mounted within the longitudinal confines of the tramper platen and its supporting tower and thereby reduces the overal dimensions of the baling press.

The inner tramper section 33 is connected to the outer section 34 by a toggle mechanism which is also employed to provide a positive lock to prevent any accidental upward movement of the tramper when in its lowermost position. Unless such a locking means is provided, it is possible that leakage of the hydraulic mechanism for operating the tramper will permit the wall 20 to creep or slide upwardly and thus cause a fin to be formed on the baled material. The present construction eliminates this objectionable feature. This means comprises complementary sets of toggle linkage mechanism which are connected to opposite pivots at the tops of bars 35. Each set includes a stub shaft 42 mounted in a bracket 43 projecting outwardly from the top of one of the bars 35. A pair of upper links 44 have their upper ends pivoted to opposite ends of one of the stub shafts 42, while the lower ends of the links 44 are pivotally mounted upon one of a pair of intermediate shafts 45. Pairs of lower links 46 are provided, and the upper ends of each pair are journalled on their respective shaft 45. These links 46 are pivotally secured intermediate their ends to the outer section 34 of the tramper platen, as at 47. Each link 46 is extended below the pivot point 47 and is connected adjacent its lower end to one end of a spring 48, the other end of this spring being connected to one of the links 46 mounted at the other side of the outer section 34 of the tramper platen. The springs 48 urge the upper ends of the links 46 outwardly. In doing so, they press or urge wheels or rollers 49 outwardly against the rails or tracks 31. These rollers are insets of two, one roller of each set being journalled upon an end of one of the intermediate shafts 45 (see Figure 3).

With this arrangement, and assuming that the tramper platen is in its raised position, the latter is thus ready to be moved downwardly by the piston 38. Assuming that scrap material has been moved from the receptacle 14 to the chamber 13, and that the gatherer platen 15 remains in its innermost position with the wall 19 forming a part of the chamber 13, downward movement of the piston 38 will transmit motion from the inner section 33, through the toggle mechanism to the outer section 34 and thus to the wall or face plate 20. This will gradually compress the material in the chamber 13 down into the press box 11. As the tramper platen descends, the links 44 and 46, and rollers 49, will move downwardly, the rollers riding on the tracks 31. The rollers 49 will reach the outwardly curved portions or pockets 32 just as the tramper wall 20 moves to its lowermost position. The action of the springs, together with the toggle action of the links 44 and 46, will urge the rollers outwardly into the pockets 32. In this position the upper ends of the links 46 will be inclined outwardly, and the upper links 44 will be moved to substantially the same horizontal plane as the brackets 43, these brackets and the rest of the inner section 33 moving downwardly a short distance relative to the outer section as the links move outwardly into locking position. This position of the links and rollers will prevent any movement of the platen initiated by an upward thrust upon the same and thus provide an effective lock to retain the tramper platen in its lowermost position against any thrust or pressure exerted upon the platen from below the same. It is to be understood, of course, that the tramper platen may be readily raised to its uppermost position by actuation of the piston 38. Such movement will exert an upward pull on the links 44 and 46, which will move back to their initial positions as the rollers move out of the pockets 32.

Referring particularly to Figures 1 and 2, the gatherer platen and its operating means is disclosed in detail. The receptacle 14 is extended outwardly to provide a frame or housing for the gatherer platen 15 in its outermost position. This includes a top wall or side 50 and side walls 51 and 52, respectively. As previously stated, the top wall 50 adjacent the chamber 13, is provided with an opening 18 to permit the scrap material to be deposited in the receptacle in advance of the wall 19 of the gatherer platen.

In a manner similar to that of the tramper platen, the gatherer platen is provided with an operating piston 53 and cylinder 54 mounted within the frame or housing and positioned within the confines of the gatherer platen when in its outer position, thus forming with the housing and platen a compact unit. The cylinder is suitably supported at its inner and outer ends by brackets 55 and 56, respectively. Bracket 56 comprises upper and lower members engaging opposite sides of the cylinder and connected to I beams 57, 58, which extend across the housing and are connected to opposite sides 51 and 52 thereof.

The gatherer platen comprises inner and outer sections 59 and 60 respectively. The inner section includes a cross bar 61 connected to the inner end of the piston 54. To the end of the cross bar are secured longitudinally extending beams 62 and 63 which connect at their outer ends to an end plate 64. This plate is provided with sets of diverging arms 65 which are connected to the outer platen section 60 by means of toggle mechanism similar to that employed between the inner and outer sections 33 and 34 of the tramper platen.

The outer section 60 is of box-like formation having the scrap compressing wall 19 and top and bottom walls 66 and 67 respectively, the top wall 66 being imperforate for a reason to be hereinafter described. Upper and lower fins or ribs 68 and 69 are connected to and extend inwardly from the top and bottom walls.

The toggle mechanism connecting the inner and outer sections 59 and 60 comprises locking means for positively locking the gatherer platen in its innermost position where the member 19 forms a wall of the chamber 13. In this connection, sets of rails or tracks 70 are provided on the inner faces of the top wall 50 and the floor 71 of the receptacle 14. These tracks are extended outwardly at their inner ends to provide pockets 72 for receiving the sets of rollers 73 (see Figure 9) when the gatherer platen is in its innermost position. These rollers are mounted upon cross shafts 74. Upon these shafts are also journalled the inner and outer links 75 and 76 corresponding to the links 46 and 44, respectively, of the tramper platen. The links 75 are pivoted intermediate their ends to the fins or ribs 68 and 69 of the outer section 60, as at 77, and the inner ends of each set of links 75 are connected by a coil spring 78, which normally urges the upper ends of the links 75 and the rollers 73 outwardly toward the rails or tracks 70. The outer ends of the links 76 are pivoted to shafts 79, each shaft being mounted in the inner ends of one set of arms 65. That is, the upper shaft is journalled in an upper pair of arms 65, while the lower shaft is likewise journalled in a pair of lower arms 65.

After scrap material has been loaded through the opening 18 in the receptacle 14, the piston 53 is actuated to move the gatherer platen inwardly, whereby the face or wall 19 presses the material into the chamber 13. During the inward movement of the gatherer platen, the rollers 73 will ride upon the tracks 70 and will be forced outwardly into the pockets 72 by the springs 78, just as the wall 19 moves to its innermost position and forms a wall of the chamber 13. In this inward position, the links 76 will be moved to the position shown in Figure 9, that is, in a substantially vertical position. Thus in a manner similar to that described with respect to the tramper platen, this toggle mechanism will effect a positive lock to prevent outward movement of the wall 19, even though there is a slight leakage which would otherwise permit outward movement of the piston 53, and, consequently, a slight movement of the wall 19 away from the chamber 13. As in the operation of the tramper platen, as the rollers 73 move into their respective pockets 72, there will be a slight longitudinal movement of the inner section 59 relative to the outer section 60.

In order to assist the gatherer platen in its movement to and from the chamber 13, an additional set of rollers 80 are provided, which rollers ride on the tracks or rails 70 (see Figure 1). These rollers are supported in brackets 81 which are mounted at opposite ends of a cross rod 82 secured to the underside of the lower set of arms 65. With this construction, it will be apparent that the weight of the outer portion of the gatherer platen will be supported by the brackets 81 and the rollers 80 as the platen moves in the receptacle 14.

It will be observed that the upper wall 66 of the gatherer platen constitutes a platform upon which scrap metal may be deposited when the gatherer platen is in its innermost position and forming a wall of the chamber 13 during compression of the material by the tramper platen. Cooperating with the top wall 66 and located directly above the same, is a shield or apron 85 secured to the top wall 50 of the receptacle and extending along the outer edge of the opening 18. This shield or apron prevents the scrap metal from moving rearwardly with the wall 66 when the gatherer platen is moved to its outward position. In other words, it constitutes a stop which retains the metal and permits it to drop into the receptacle as the wall 66 gradually moves to its outward position. Thus with this construction, the baling operation is greatly expedited, since it is possible to immediately start depositing scrap material on the wall 66 in position to drop into the receptacle 14, even while the gatherer platen is in its innermost position and while the tramper platen is functioning to compress the material into the press box 11.

As previously stated, the piston or ram 16 is operated in the press box 11 to act upon the material which has been pressed into the press box by the tramper platen, and to compress it into substantially its final form adjacent one end of the press box and in line with the transverse ram 17. To support and facilitate movement of the piston 16, a bracket 83 is mounted adjacent the head of the piston and supports a spring pressed roller 84 which rides on the floor 21 of the press box.

Figure 5:
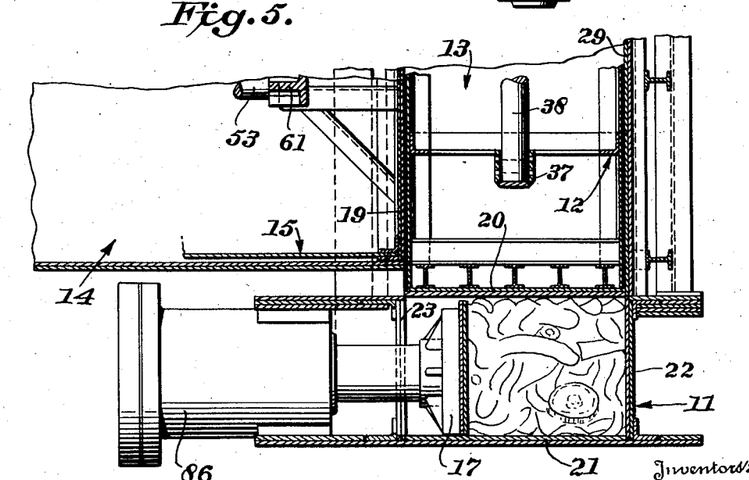
Figure 5 is a fragmentary vertical sectional view showing the tramper platen and final compression ram.

The ram 17 is mounted to reciprocate in any desired type of hydraulic cylinder 86. As shown in Figure 5, the ram has compressed the bale only about a quarter of the width of the press box. However, this final dimension of the bale may be varied at will, and the ram may be moved to the center point of the press box, or, further, according to the size of bale desired.

Figure 4:
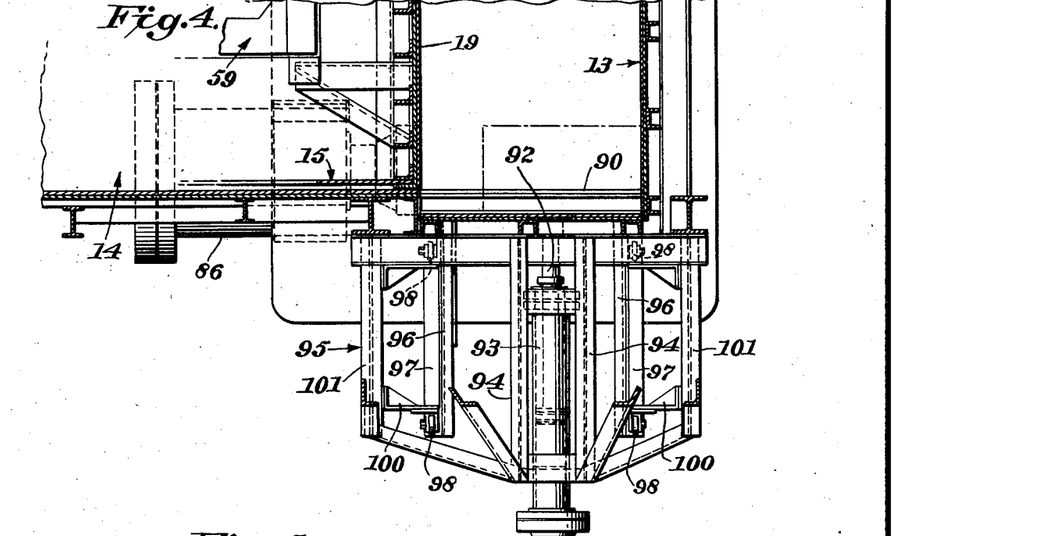
Figure 4 is a fragmentary horizontal sectional view through a portion of the baling press showing the extractor mechanism.
Figure 6:
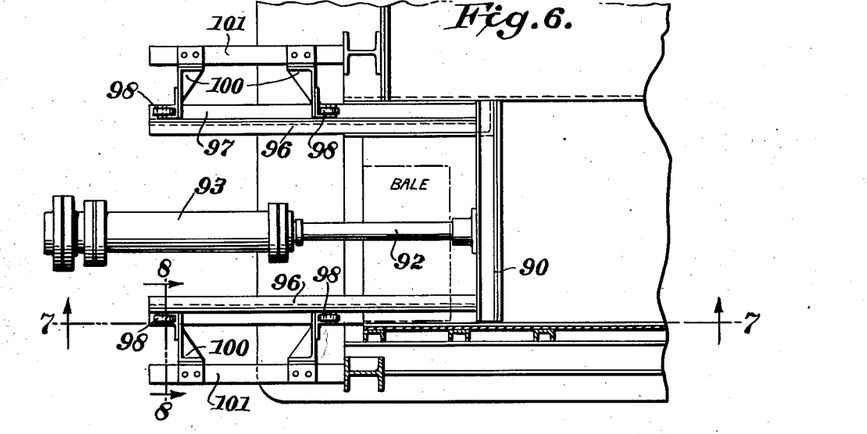
Figure 6 is a fragmentary horizontal section showing the extractor platen and its operating means.
Figure 7:
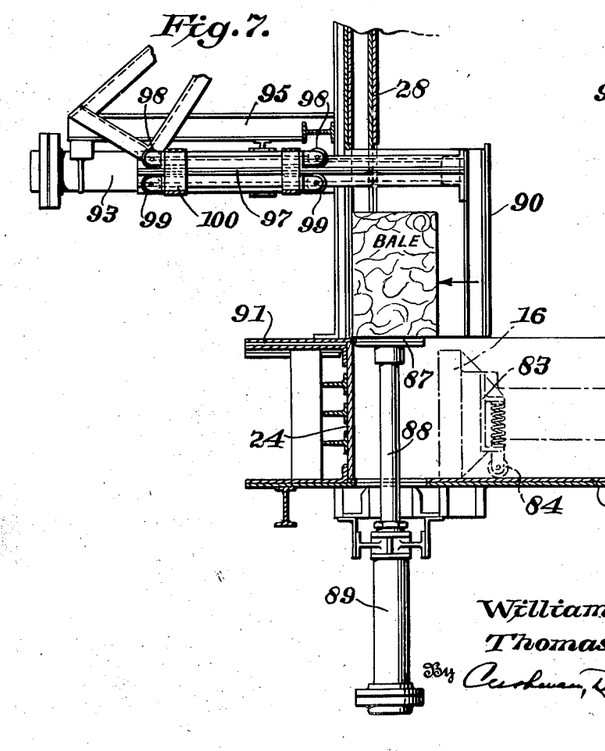
Figure 7 is a fragmentary vertical sectional view showing the ejector and extractor mechanisms.

Referring to Figures 4, 6 and 7, it will be observed that after the piston 16 and ram 17 have pressed the bale to its final form, the latter is positioned directly upon an ejector platform 87, which normally constitutes a portion of the floor 21 of the press box. The underside of this platform is connected to a piston 88 mounted to reciprocate in a hydraulic cylinder 89. The arrangement is such that after the bale is formed, it may be raised to the position shown in Figure 7 by actuation of the piston 88. This piston moves the bale to a point directly above the top of the press box and within the confines of the tramper chamber 13.

Cooperating with the ejector platform 87 to eject the bale from the baling press, is an extractor platen 90 slidable into and out of the chamber 13, and normally constituting a portion of the wall 28 of the chamber 13 when in its inoperative position. As shown in Figure 7, when it is desired to eject a bale, it is necessary, first, to move the extractor platen 90 into its extracting position within the chamber 13, prior to operating the platform 87. However, after the extractor platen has been moved inwardly beyond the platform, the latter raises the bale to the position shown in Figure 7, whereby it may be extracted from the baling press. Outward movement of the platen 90 will contact the bale and slide it transversely off the platform 87 onto the top flange plate 91 of the press box 11. Thereafter, bales may be removed manually, or the above mechanism may serve to push them tandem fashion onto a conveyor or other mechanical means of removal.

Figure 8:
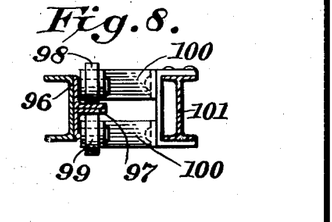
Figure 8 is a section taken on line 8—8 of Figure 6.
Figure 10:
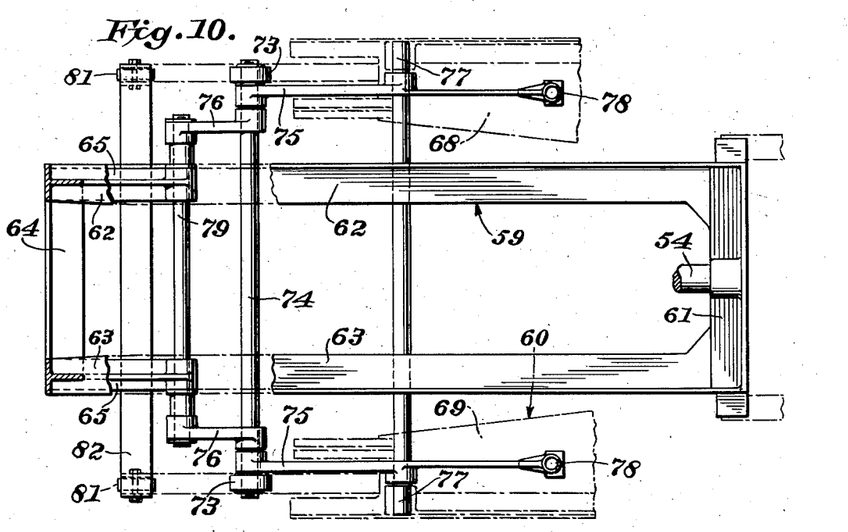
Figure 10 is a fragmentary view of the gatherer platen with the cylinder and piston removed.
Figure 11:
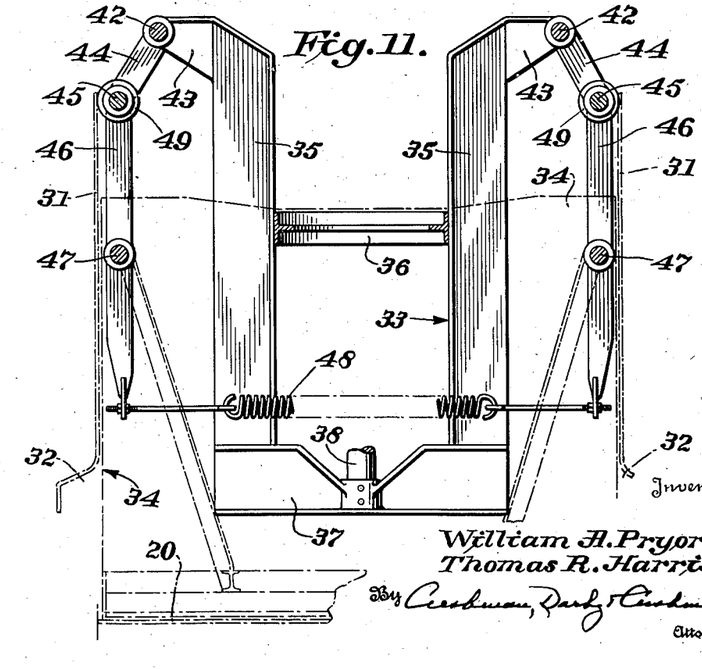
Figure 11 is a fragmentary view of the tramper platen with the cylinder and piston removed.

The means for actuating the extractor platen 90 comprises a piston 92 having its outer end secured centrally of and adjacent the top of the platen and operable in a cylinder 93. This cylinder is supported between longitudinally extending bars 94 forming a part of a frame structure 95. This frame structure also constitutes means for supporting a pair of guide rods 96, each rod having its inner end secured to an upper end portion of the platen 90 upon one side of the cylinder 93. Each guide rod 96 is provided with a flange 97 extending longitudinally thereof. This flange rides between sets of upper and lower rollers 98 and 99, each set being mounted in a bracket 100, said brackets being secured to one of a pair of outer I-beams 101 forming a part of the frame structure 95 (see Figures 4, 6 and 8). This construction facilitates the movement of the extractor platen 90 to and from its extracting position and cooperates in steadying and guiding the platen as it extracts a bale from the ejector platform 87 to the top flange plate 91 of the press box 11. It will further be apparent that this construction greatly facilitates the removal of a finished bale from the baling press, since the ejector platform 87 and the extractor platen 90 may be easily and quickly operated for moving the bale to the exterior of the press.

The construction as thus described is capable of quickly and efficiently baling scrap material. Assuming that the several elements are in the position shown in Figure 9, scrap material may be initially deposited upon the top wall 66 of the gatherer platen 14 while the latter is in its inward position, and the wall 19 thereof constituting a wall of the chamber 13 during the downward movement of the tramper platen 12. As soon as the wall 20 of the tramper platen has moved to its lowermost position directly above the press box, the gatherer platen may be retracted to the position shown in Figure 1. During this movement the wall 20 of the tramper platen will act as the top wall of the press box while the ram 16 is further compressing the material toward the ejecting end of the box. As the gatherer platen is moved outwardly from the chamber 13, the scrap material deposited on the top wall 66 will fall into the receptacle 14 and be prevented from moving rearwardly with the wall 66 by reason of the apron or shield 85. If sufficient scrap has not been placed on the wall 66, this filling operation may be completed after the wall 19 is in its outermost position. As soon as the receptacle 14 is charged, the gatherer platen may be immediately moved inwardly, since the tramper platen will, by this time, have moved upwardly out of the chamber 13. In this connection, it is to be assumed that during the retraction of the gatherer platen and the subsequent charging of the receptacle 14, the piston 16 and ram 17 will have completed the final baling operations, that the ejecting mechanism will have removed the bale from the press, and that the compression pistons will have returned to their former wide open positions. The gatherer platen is then ready to move inwardly and push the scrap material into the chamber 13, whereupon the tramper platen may again move downwardly to force and compress the material into the press box 11 and thus start forming another bale. During this time, and as soon as the gatherer platen moves to its inward position, another load of scrap material may be deposited upon the wall 66 preparatory to charging the receptacle 14. These operations may be repeated continuously to quickly and efficiently bale scrap material and eject it ready for delivery to any desired point.

It is to be understood that the expression in the claims "clear of one of the walls of the chamber" is to be interpreted to include either an opening in the wall or the space above the wall. It is further to be understood that the invention is not limited to the details of construction shown in the drawings, and that the phraseology employed in the specification is for the purpose of description and not of limitation.

We claim:

1. In a baling press, a press box in which the material is given a final compression, a platform located at one end of the press box and normally forming a portion of the floor of the press box and upon which the bale is compressed to final form, means for raising the platform to a position above the press box, an extractor platen horizontally movable to and from a position inwardly of the press box and platform to move the bale from the platform to a point exteriorly of the press box, means for operating the extractor platen, and guiding and supporting means for the extractor platen including a pair of spaced bars having their inner ends secured to said platen, each bar having a longitudinally extending flange, a pair of spaced stationary frame members, and a pair of spaced rollers mounted on each frame member and engageable with one of the bar flanges, whereby upon movement of the extractor platen the flanges will ride on and between the rollers.

2. In a baling press, a press box in which the material is given a final compression, a platform located at one end of the press box and normally forming a portion of the floor of the press box and upon which the bale is compressed to final form, means for raising the platform to a position above the press box, an extractor platen horizontally movable to and from a position inwardly of the press box and platform to move the bale from the platform to a point exteriorly of the press box, means for operating the extractor platen including a piston and cylinder mechanism located adjacent the top and centrally of the extractor platen, and guiding and supporting means for the extractor platen comprising a pair of spaced bars located on opposite sides of the piston and having their inner ends secured to said platen, each bar having a horizontal longitudinally extending flange, a pair of spaced stationary frame members, and pairs of spaced rollers mounted on each frame member engageable with the bar flanges whereby upon moevment of the extractor platen the flanges will ride on and between the sets of rollers.

3. In a baling press, a press box in which the material is given a final compression, that portion of the baling press above the press box constituting a chamber within which a tramper platen is adapted to operate to compress the material into the press box, a platform located at one end of the press box and normally forming a portion of the floor of the press box and upon which the bale is compressed to final form, means for raising the platform to a position above the press box, and an extractor platen horizontally movable to and from a position inwardly of and above the raised platform, whereby return movement of said platen will contact the bale and slide it off the platform to a position exteriorly of the press, said extractor platen in its outward position constituting a portion of a wall of the tramper platen receiving chamber and in its inward position forming an opening in the chamber wall for the discharge of the bale.

4. In a baling press, a press box in which the material is given a final compression, that portion of the baling press above the press box constituting a chamber within which a tramper platen is adapted to operate to compress the material into the press box, means for raising the bale from the floor of the press box to a position within the tramper platen receiving chamber, and an extractor platen movable laterally of the bale raising means to a position inwardly of said means whereby return movement of said extractor platen will contact the bale and move it away from said means, said extractor platen in its outward position constituting a portion of a wall of the tramper platen receiving chamber and in its inward position forming an opening in the chamber wall for the discharge of the bale.

5. In a baling press, a press box, a tramper platen receiving and guiding chamber located above and opening into the press box whereby the tramper platen is adapted to compress the material being baled into the press box, a compression ram movable into and longitudinally of the press box and adapted to compress the material into one end of the press box, a ram movable into and transversely of the press box and adapted to give the material its final compression subsequent to the operation of the longitudinally movable ram, a bale raising platform normally forming a portion of the floor of the press box in line with the transverse ram and located in a position to receive the finished bale, means for raising the platform above the press box, and means for sliding the raised bale off the platform to a position exteriorly of the baling press.

6. In a baling press, a press box, a tramper platen receiving and guiding chamber located above and opening into the press box whereby the tramper platen is adapted to compress the material being baled into the press box, a compression ram movable into and longitudinally of the press box and adapted to compress the material into one end of the press box, a ram movable into and transversely of the press box and adapted to give the material its final compression subsequent to the operation of the longitudinally movable ram, a bale raising platform normally forming a portion of the floor of the press box in line with the transverse ram and located in a position to receive the finished bale, means for raising the platform above the press box, and means for sliding the raised bale off the platform to a position exteriorly of the baling press, said means comprising an extractor platen movable laterally of the platform to a position inwardly thereof and constituting a wall of the tramper platen chamber when in its outward position, said extractor platen in its inward position forming an opening in the chamber wall for the discharge of the bale.

7. In a baling press, a press box, a tramper platen receiving chamber positioned above and opening into the press box, said chamber being closed on all but one side, a scrap receiving receptacle extending from and communicating with the open side of the chamber, said receptacle being open at its top, a gatherer platen slidable into and out of the receptacle to move scrap material into the chamber and constituting in its innermost position a wall of said chamber, said gatherer platen having a top wall upon which scrap material may be placed when said platen is in its inward position, and means on said receptacle above the gatherer platen for directing the scrap material on said platen into the receptacle as the platen moves to its outward position.

8. In a baling press, a press box, a tramper platen receiving chamber positioned above and opening into the press box, said chamber being closed on all but one side, a scrap receiving receptacle extending from and communicating with the open side of the chamber, said receptacle being open at its top, a gatherer platen slidable into and out of the receptacle to move scrap material into the chamber and constituting in its innermost position a wall of said chamber, said gatherer platen having a top wall upon which scrap material may be placed when said platen is in its inward position, and a scrap retaining apron extending across the outer end of the opening in the top of the receptacle and located directly above the top wall of the gatherer platen to prevent any scrap material on said top wall from moving outwardly with said wall and to direct the scrap into the receptacle during recession of the gatherer platen from the chamber.

9. In a baling press, a scrap receiving receptacle having an opening in its top wall, a gatherer platen movable in and longitudinally of said receptacle for moving the scrap material out of the receptacle and into position to be baled, said gatherer platen having a top wall upon which scrap material may be placed when said platen occupies the space in the receptacle below the opening in its top wall, and means on said receptacle above the gatherer platen for directing the scrap material on said platen into the receptacle as the gatherer platen moves away from the opening in the top wall of the receptacle.

10. In a baling press, a scrap receiving receptacle having an opening in its top wall, a gatherer platen movable in and longitudinally of said receptacle for moving the scrap material out of the receptacle and into position to be baled, said gatherer platen having a top wall upon which scrap material may be placed when said platen occupies the space in the receptacle below the opening in its top wall, and a scrap retaining apron extending across the outer end of the opening in the top wall of the receptacle and located directly above the top wall of the gatherer platen to prevent any scrap material on said top platen wall from moving therewith and to direct the scrap into the receptacle as the gatherer platen moves away from the opening in the top wall of the receptacle.

11. In a baling press, a compression chamber, a compression platen of substantially hollow formation movable to and from said chamber to compress material therein, a supporting and guiding frame for said compression platen, and operating means for said platen including a piston having one end connected to said platen adjacent its inner end, and a hydraulic cylinder for said piston mounted in said frame and located substantially within the confines of the platen when the latter is in its outermost inoperative position.

12. In a baling press, a compression chamber, a compression platen movable to and from said chamber to compress material therein, a supporting and guiding frame for said compression platen, said platen comprising inner and outer sections, operating means for said platen connected to said inner platen section and substantially located within the confines of said platen when the latter is in its outer inoperative position, and locking means connecting the inner and outer platen sections and transmitting motion from the inner to the outer section and cooperating with said frame to lock said platen in its innermost position against outward longitudinal thrusts.

13. In a baling press, a compression chamber, a compression platen movable to and from said chamber to compress material therein, a supporting and guiding frame for said compression platen, said platen comprising inner and outer sections, said inner section being of open frame formation and having an inner cross bar connected to longitudinally extending bars, operating means for said compression platen including a cylinder mounted in said frame between said longitudinally extending bars and located substantially within the confines of said inner section when the compression platen is in its outer inoperative position, a piston operating in said cylinder and having its inner end connected to the cross bar of the inner section, an end plate connecting the outer ends of the longitudinally extending bars of said inner section, and toggle locking means connecting the end plate of the inner platen section to the outer platen section, said toggle locking means transmitting motion from the inner to the outer section and cooperating with said frame to lock said platen in its innermost position against outward longitudinal thrusts.

14. In a baling press, a compression chamber, a compression platen movable to and from said chamber to compress material therein, a supporting and guiding frame for said compression platen, said platen comprising inner and outer sections, said inner section being of open frame formation and having an inner cross bar connected to longitudinally extending bars, operating means for said compression platen including a cylinder mounted in said frame between said longitudinally extending bars and located substantially within the confines of said inner section when the compression platen is in its outer inoperative position, a piston operating in said cylinder and having its inner end connected to the cross bar of the inner section, an end plate connecting the outer ends of the longitudinally extending bars of said inner section, and toggle locking means connecting the end plate of the inner platen section to the outer platen section, said toggle locking means transmitting motion from the inner to the outer section and cooperating with said frame to lock said platen in its innermost position against outward longitudinal thrusts, said toggle locking means operating to move said outer platen section as a unit with said inner section throughout the greater portion of the travel of said platen to and from the compression chamber but effecting a slight relative longitudinal movement of said sections as the platen nears the compression chamber and completes its locking action.

15. In a baling press, a compression chamber, a compression platen movable to and from said chamber to compress material therein, a supporting and guiding frame for said compression platen, said platen comprising inner and outer sections, said inner section being of open frame formation and having an inner cross bar connected to longitudinally extending bars, operating means for said compression platen including a cylinder mounted in said frame between said longitudinally extending bars and located substantially within the confines of said inner section when the compression platen is in its outer inoperative position, a piston operating in said cylinder and having its inner end connected to the cross bar of the inner section, and toggle locking means connecting the outer portion of the inner platen section to the outer platen section, said toggle locking means transmitting motion from the inner to the outer section and cooperating with said frame to lock said platen in its innermost position against outward longitudinal thrusts.

16. In a baling press, a press box, a tramper platen receiving chamber positioned above and opening into the press box, said chamber being closed on all but one side, a scrap receiving receptacle extending from and communicating with the open side of the chamber, said receptacle being open at its top, a gatherer platen slidable into and out of the receptacle to move scrap material into the chamber and constituting in its innermost position a wall of said chamber, a compression ram movable into and longitudinal of the press box and adapted to compress the material into one end of the press box, and a ram extending parallel to and to one side of the gatherer platen, said last mentioned ram being movable into and transversely of one end of the press box and adapted to give the material its final compression subsequent to the operation of the longitudinally extending ram.

17. In a baling press, a press box in which the material is compressed, means for raising the bale from the floor of the press box to a position clear of the walls of the press box, said means including a platform normally forming a portion of the floor of the press box adjacent one end of said box, an extractor platen having a single vertically extending bale engaging arm mounted for sliding movement above the press box, and means for moving said extractor platen to a position inwardly of and over the press box, the extreme inner position of said arm being located inwardly of the inner extremity of the platform, whereby the platform with the bale may be raised to ejecting position subsequent to movement of the arm to its innermost position over the press box so that upon return movement of said platen, the arm will engage the bale and slide it off of the platform clear of the press box.

WILLIAM A. PRYOR.
THOMAS R. HARRIS.